US006288504B1

United States Patent
Imamura et al.

(10) Patent No.: US 6,288,504 B1
(45) Date of Patent: Sep. 11, 2001

(54) DEFLECTION CURRENT/HIGH VOLTAGE INTEGRATION TYPE POWER SUPPLY

(75) Inventors: Nobuaki Imamura, Omihachiman; Haruo Takahashi, Moriyama, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/291,565

(22) Filed: Apr. 14, 1999

(30) Foreign Application Priority Data

Apr. 24, 1998 (JP) .................................................. 10-115120

(51) Int. Cl.⁷ ...................................................... H01J 29/70
(52) U.S. Cl. ............................................. 315/411; 315/399
(58) Field of Search ............................... 315/411, 368.28, 315/380, 399, 364, 366, 367, 369, 370, 405, 5.43, 408, 410, 244, 279, 225, 291

(56) References Cited

U.S. PATENT DOCUMENTS

| | | | |
|---|---|---|---|
| 3,911,214 | * 10/1975 | Mitsuda ............................. | 315/411 |
| 3,912,972 | * 10/1975 | Otten et al. ........................ | 315/411 |
| 4,112,337 | * 9/1978 | Nagasaki et al. .................. | 315/411 |
| 4,368,409 | * 1/1983 | Sivanesan et al. ................. | 315/411 |
| 4,841,201 | * 6/1989 | Takizawa et al. .................. | 315/411 |
| 4,885,509 | * 12/1989 | Ikeuchi .............................. | 315/411 |
| 4,956,587 | 9/1990 | Kitou et al. ........................ | 315/408 |
| 4,958,110 | * 9/1990 | Hayase .............................. | 315/408 |
| 5,049,792 | * 9/1991 | Oh ..................................... | 315/411 |
| 5,285,133 | * 2/1994 | Ogura ................................ | 315/371 |
| 5,627,437 | * 5/1997 | Kim ................................... | 315/399 |
| 5,754,015 | * 5/1998 | Nagaoka et al. ................... | 315/411 |

FOREIGN PATENT DOCUMENTS 0418673   3/1991   (EP) .

0 952 731 A2   * 10/1999   (JP) .

OTHER PUBLICATIONS

Patent Abstracts of Japan—Appln. No. 03245004 dated Aug. 30, 1991 "Horizontal Deflecting High Voltage Generation Circuit".

Patent Abstracts of Japan—Appln. No. 06086045 dated Mar. 31, 1994 "Horizontal Deflection High Voltage Generation Circuit".

* cited by examiner

Primary Examiner—Don Wong
Assistant Examiner—Trinh Do Dinh
(74) Attorney, Agent, or Firm—Ostrolenk, Faber, Gerb & Soffen, LLP

(57) ABSTRACT

A deflection current/high voltage integration type power supply has a flyback transformer having a primary winding and a secondary winding; a series circuit of a deflection coil and a first capacitor, connected in series to the primary winding of the flyback transformer; a resonance capacitor connected in parallel to the series circuit of the deflection coil and the first capacitor; a first switching element, connected in parallel with the series circuit of the deflection coil and the first capacitor, to be turned on/turned off by a drive signal so that a high voltage is generated at the secondary winding of the flyback transformer and a deflection current flows in the deflection coil; a parallel connection circuit of a second switching element and a second capacitor, connected in series to the primary winding of the flyback transformer; and a switching control means to control the deflection current flowing in the deflection coil and the high voltage generated at the secondary winding of the flyback transformer by controlling the on-timing and the off-timing of the second switching element in approximate synchronism with the drive signal.

9 Claims, 9 Drawing Sheets

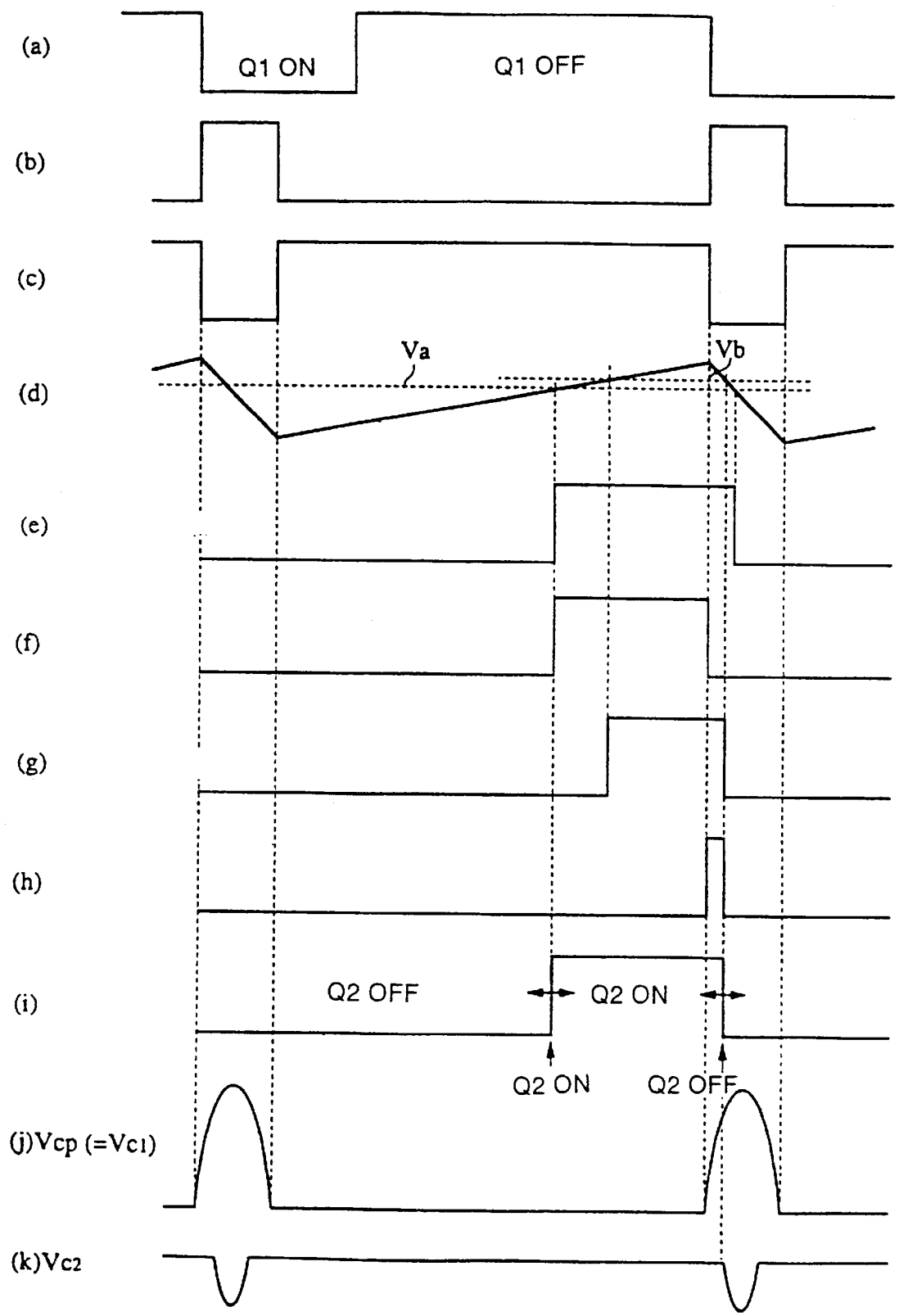

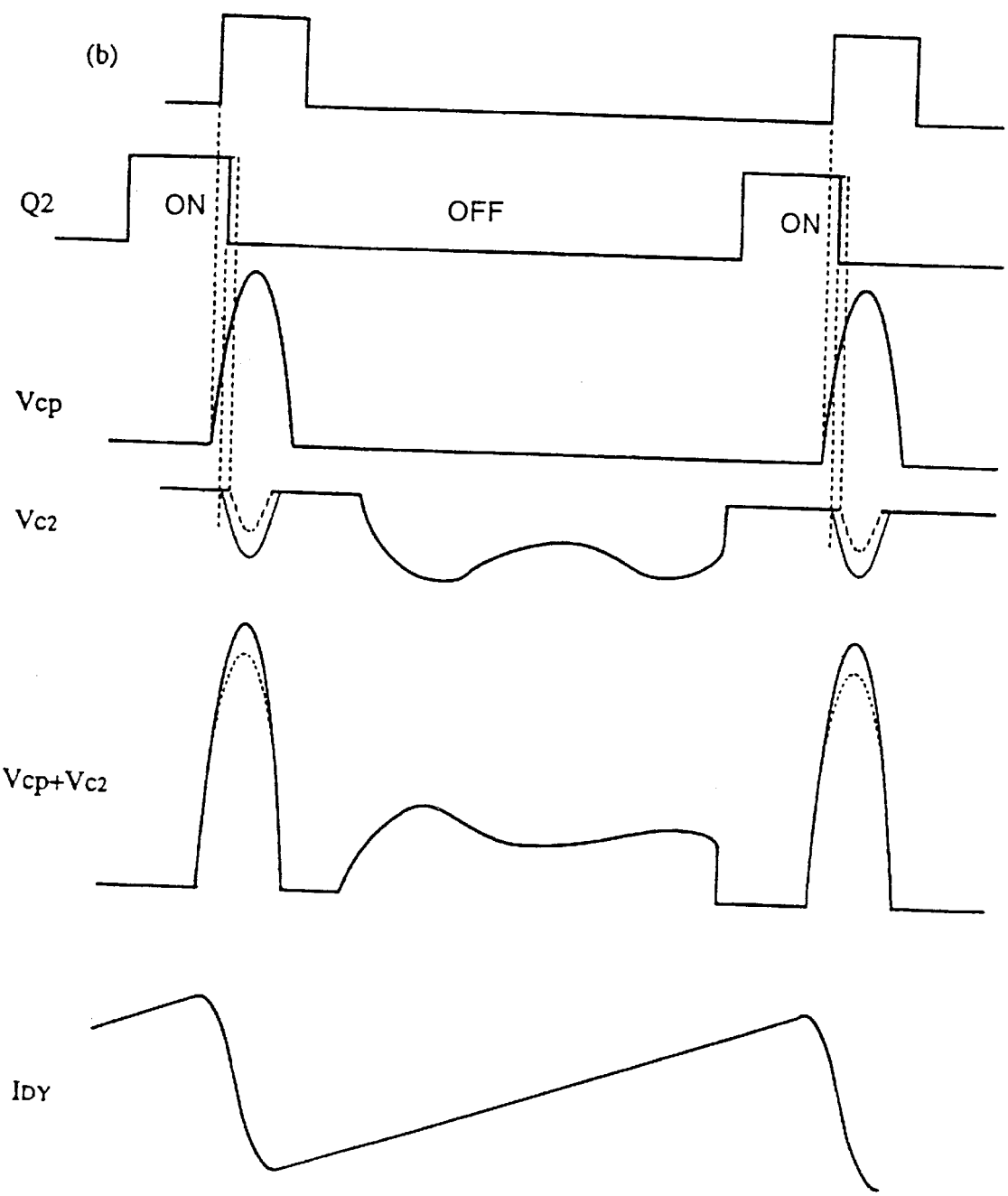

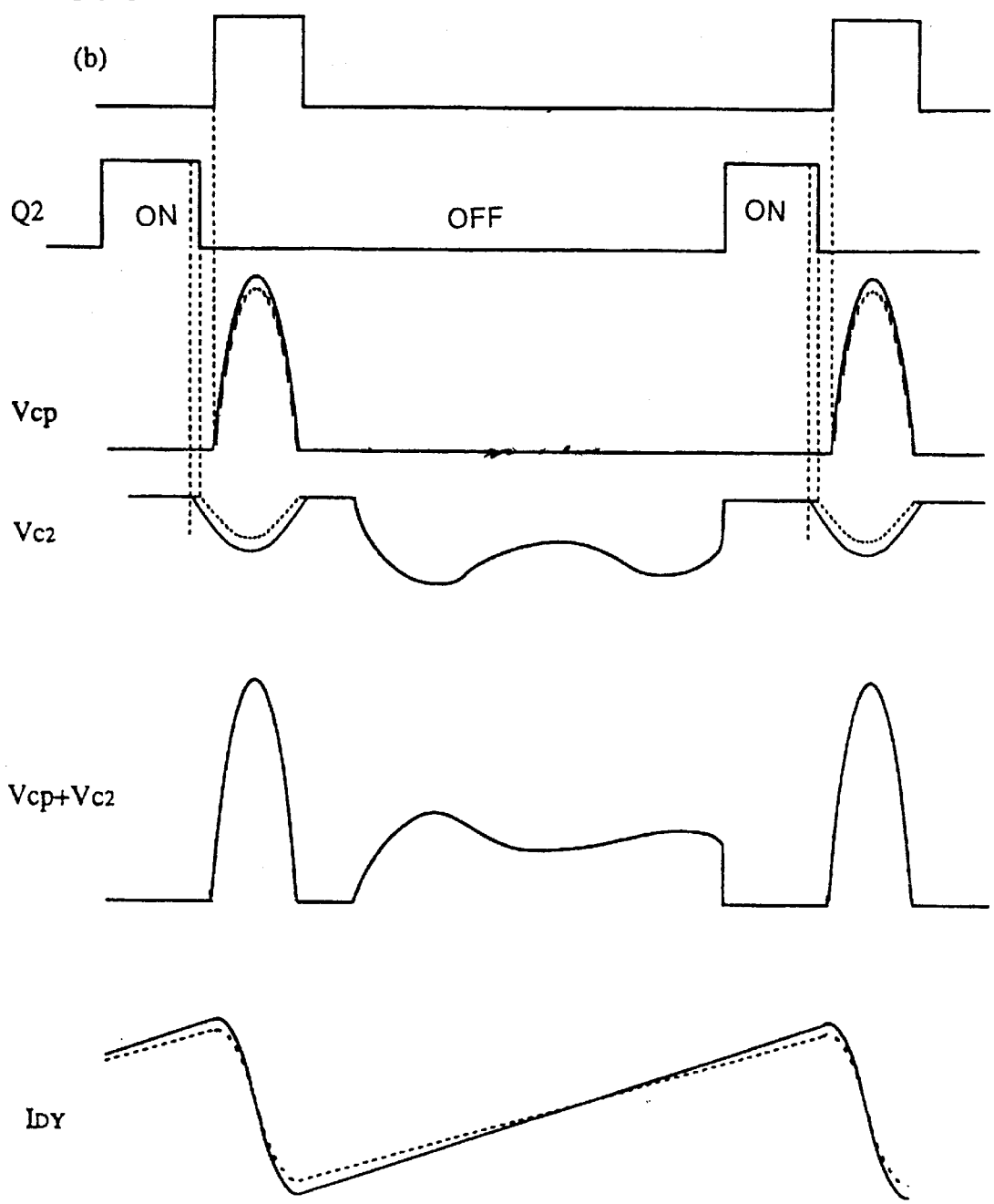

DEFLECTION CURRENT/HIGH VOLTAGE INTEGRATION TYPE POWER SUPPLY

BACKGROUND OF THE INVENTION

1. Field of the Invention

The present invention relates to a power supply for applying a high voltage and a deflection current to a cathode ray tube (CRT), etc.

2. Description of the Related Art

A high-voltage generation circuit using a flyback transformer has been employed in a power supply for a CRT. The high-voltage generation circuit using the flyback transformer supplies the anode voltage to an anode of the CRT and a deflection current to a deflection yoke of the CRT. A power supply enabling these two roles by a single flyback transformer is referred to as a deflection current/high voltage integration type power supply.

Conventionally, CRT displays for computers are required to display a highly precise image. Therefore, a deflection current/high voltage separation type power supply including a circuit part for generating a deflection current and a circuit part for generating a high voltage separately has been generally used. However, there arises a demand for a deflection current/high voltage integration type power supply for CRT displays for computers because of cost reduction and miniaturization requirements.

Such a deflection current/high voltage integration type power supply device controls the high voltage by feedback. However, the deflection current is affected and fluctuates due to the control for stabilization of the high voltage when the high voltage load changes. In general, the horizontal amplitude of the screen is proportional to $I_{DY}/\sqrt{(V_{II})}$, where $I_{DY}$ is the deflection current and $V_{II}$ is the high voltage (anode voltage) to be output from the flyback transformer. Thus, the amplitude of the screen fluctuates according to the change in brightness of the screen.

To solve this problem, a power supply of a so-called diode modulator circuit system has been proposed. In this power supply, the high voltage is stabilized by controlling the primary input voltage (+B) of the flyback transformer and the deflection current is controlled by the bias to a transistor provided in a flow path of the deflection current.

However, in the power supply device of the diode modulator circuit system, there is a problem that a switch element for controlling the voltage +B mentioned above and an element for controlling the deflection current are also required in addition to a main switch element to connect/disconnect the primary current in the flyback transformer, and the number of total elements becomes large, and the circuit becomes complex. Further, there is a problem in that the responsiveness in stabilization of the high output voltage and stabilization of the deflection current deteriorate because smoothing circuits are interposed at the +B control part and the deflection current control part.

SUMMARY OF THE INVENTION

It is therefore an object of the present invention to provide a deflection current/high voltage integration type power supply capable of stabilizing the high voltage and stabilizing the deflection current with excellent response without increasing the number of switch elements.

The deflection current/high voltage integration type power supply according to the invention comprises a flyback transformer having a primary winding and a secondary winding; a series circuit comprising a deflection coil and a first capacitor, connected in series to the primary winding of the flyback transformer; a resonance capacitor connected in parallel to the series circuit of the deflection coil and the first capacitor; a first switching element, connected in parallel with the series circuit of the deflection coil and the first capacitor, to be turned on/turned off by a drive signal or a signal synchronous to said drive signal so that a high voltage is generated at the secondary winding of the flyback transformer and a deflection current flows in the deflection coil; a parallel connection circuit comprising a second switching element and a second capacitor, connected in series to the primary winding of the flyback transformer; and a switching control means to control a deflection current flowing in the deflection coil and a high voltage generated at the secondary winding of the flyback transformer by controlling the on-timing and the off-timing of the second switching element in approximate synchronism with the drive signal.

According to the present invention, both the deflection current and the high voltage at the secondary winding of the flyback transformer can be independently controlled by the on-timing/off-timing of the second switching element to control the primary input voltage (+B) of the flyback transformer, and the number of elements is not increased, or the responsiveness in controlling the high output voltage and the deflection current is not degraded because no smoothing circuit is connected to the +B control part or the deflection current control part.

Thus, both the deflection current and the high voltage can be simultaneously stabilized by respectively detecting the deflection current and the high output voltage to control the on-timing and the off-timing of the second switching element in the stabilizing direction.

The switching loss can be reduced by providing the second switching element as a MOS-FET, and providing the second capacitor as a separate component is unnecessary or its capacity can be reduced because the parasitic capacity of the MOS-FET can be utilized.

For the purpose of illustrating the invention, there is shown in the drawings several forms which are presently preferred, it being understood, however, that the invention is not limited to the precise arrangements and instrumentalities shown.

Other features and advantages of the present invention will become apparent from the following description of the invention which refers to the accompanying drawings.

BRIEF DESCRIPTION OF THE DRAWINGS

FIG. 4 shows waveforms measured at various points in the circuit diagram shown in FIGS. 1A and 1B.

FIG. 5 shows waveforms measured at various points in the circuit diagram shown in FIGS. 1A and 1B.

FIG. 7 shows waveforms measured at various points in the circuit diagram shown in FIGS. 1A and 1B.

DETAILED DESCRIPTION OF EMBODIMENTS OF THE INVENTION

Hereinafter, the preferred embodiments of the present invention are explained in detail with reference to the drawings.

A first embodiment of a deflection current/high voltage integration type power supply of the present invention is described referring to FIGS. 1A, 1B, 2A, 2B, 3A, 3B, 4 to 5, 6A and 6B.

Figure 1A:
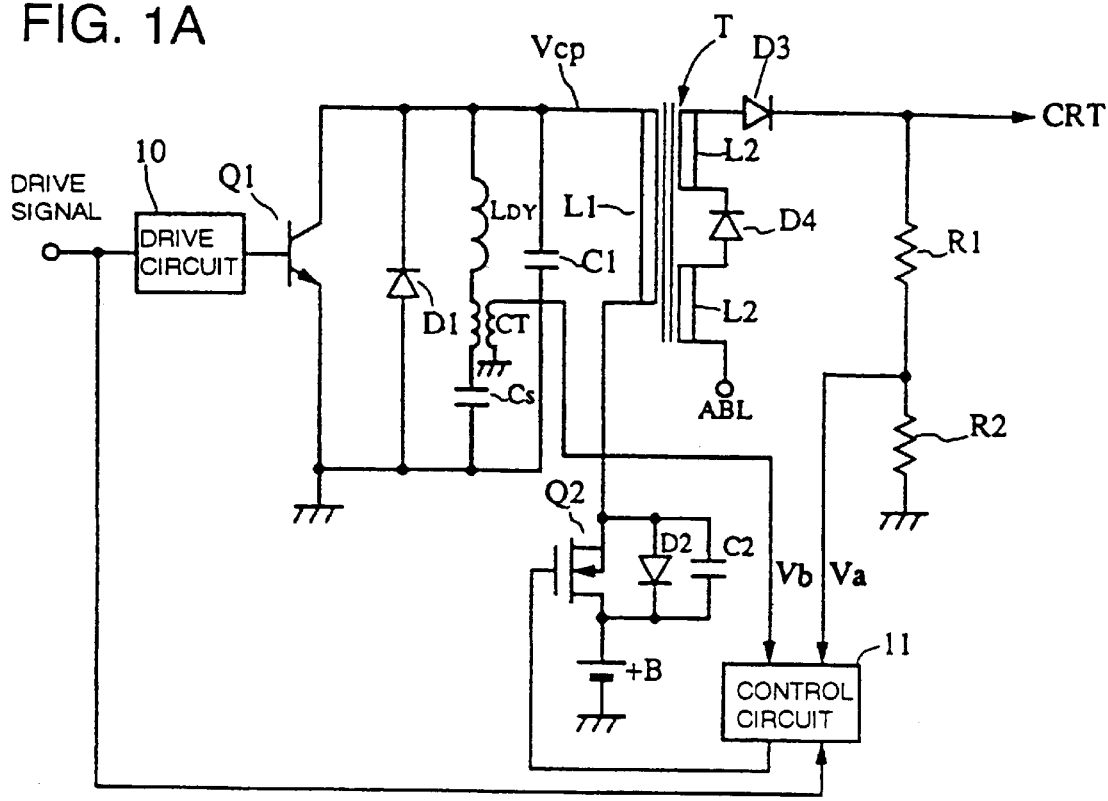
FIG. 1A is a circuit diagram of a deflection current/high voltage integration type power supply according to an example of a first embodiment of the present invention.

FIG. 1A shows an example of the first embodiment. As shown in FIG. 1A, the deflection current/high voltage integration type power supply comprises a flyback transformer T having a primary winding L1 and a secondary winding L2. A series circuit comprising a deflection coil $L_{DY}$, a current transformer CT and a capacitor $C_S$ is connected to the primary winding L1 of the flyback transformer T, and a damper diode D1 and a switch element Q1 are respectively connected in parallel to the series circuit of the deflection coil $L_{DY}$ and the capacitor $C_S$. In addition, a resonance capacitor C1 is connected in parallel to the series circuit of the deflection coil $L_{DY}$ and the capacitor $C_S$. Note that the actual capacitance of the resonance capacitor is the combined amount of a distributed capacitance of the whole winding of the flyback transformer T which is converted to the primary side, the capacitance of the resonance capacitor C1 as an individual component, and the parasitic capacitance of the switch element Q1, etc.

In general practice, a correction circuit such as a linearity correction circuit and a pin distortion correction circuit is connected in series to the deflection coil $L_{DY}$, but these correction circuits are omitted in the description of the embodiment and in the circuit diagram.

A parallel connection circuit comprising a switch element Q2, a capacitor C2 and a diode D2 is connected in series to the primary winding L1 of the flyback transformer, where D2 denotes a parasitic diode of the switch element Q2 which is an FET and C2 denotes the parasitic capacitance of Q2. A separate capacitor may be connected in parallel between the source and the drain of Q2 so that the electrostatic capacitance of C2 is set to the prescribed value as necessary. A diode as a separate component may also be connected in parallel between the source and the drain of Q2.

Rectifier diodes D3 and D4 are connected to the secondary winding L2 of the flyback transformer T. A drive circuit 10 receives a drive signal to turn on/off the switch element Q1. A control circuit 11 receives the drive signal, and also receives a high voltage control signal Va of a voltage division circuit constituted by resistors R1 and R2 and a deflection current control signal Vb sensed by a current transformer CT which is provided between the deflection coil $L_{DY}$ and the capacitor $C_S$.

The high voltage control signal Va and the deflection current control signal Vb represents the amount of the present high voltage and the deflection current, respectively, and are used as control signals for a feedback control of the high voltage and the deflection current.

Figure 1B:
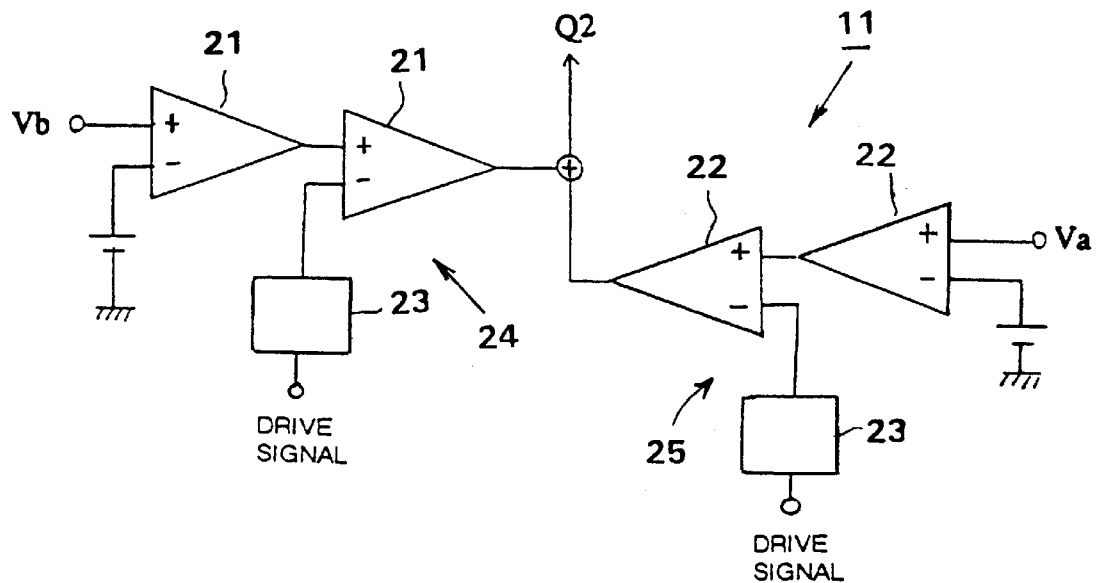
FIG. 1B is a circuit diagram of the control circuit 11 employed in the circuit shown in FIG. 1A.

As shown in FIG. 1B, the control circuit 11 comprises a comparator circuit 24 having two comparators 21 and a waveform generation circuit 23, and a comparator circuit 25 having two comparators 22 and a waveform generation circuit 23. The waveform generation circuit 23 receives the drive signal (horizontal drive signal) and generates triangular waves. In the comparator circuit 24, the deflection current control signal Vb is compared with the triangular waves from its circuit 23 and generates the signal which represents one of the on-timing and the off-timing of the switching element Q2. In the same way, in the comparator circuit 25, the high voltage control signal Va is compared with the triangular waves from its circuit 23 and generates the signal which represents the other of the on-timing and the off-timing of the switching element Q2. The generated signals in the comparator circuits 24 and 25 are synthesized and the synthesized signal is supplied to the switching element Q2 as a control signal for the switching element Q2. The details of how to generate the control signal for the switching element Q2 will be explained later.

Figure 1C:
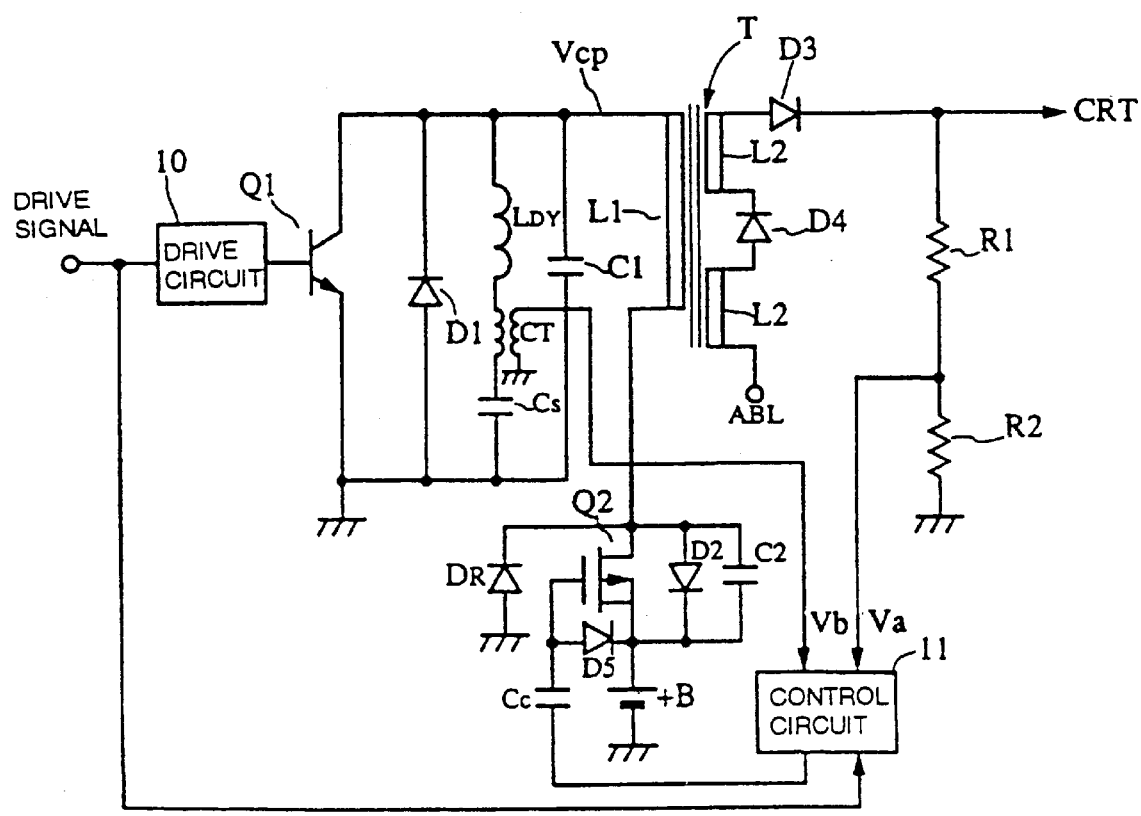
FIG. 1C is a circuit diagram of a deflection current/high voltage integration type power supply according to another example of the first embodiment of the present invention.

FIG. 1C is another example of the first embodiment, and a deflection current/high voltage integration type power supply comprises the switch element Q2 using a p-channel MOSFET. A protective diode DR is connected to the drain of the switch element Q2. By providing the protective diode DR, it is possible to use a p-channel MOSFET having a low breakdown voltage. Therefore, when the maximum value of the voltage applied across the switch element Q2 is small, or when the breakdown voltage of the switch element Q2 is high, the above-mentioned protective diode DR is not necessary. A clamp diode D5 is provided between the gate and the source of the switch element Q2 to clamp the gate potential of Q2 to +B. Other portions of the circuit are the same as those shown in FIG. 1A.

According to this example, the source is connected to +B, and the gate of the switch element Q2 can be controlled by the +B standard. Thus, a pulse transformer to generate the gate control signal is not required, and the switch element Q2 can be driven through a capacitive coupling by a capacitor $C_C$ to simplify the circuit.

The operation of the deflection current/high voltage integration type power supply of the present invention will be described hereinafter with reference to FIGS. 2A, 2B, and 3A to 3C.

Figure 2A:
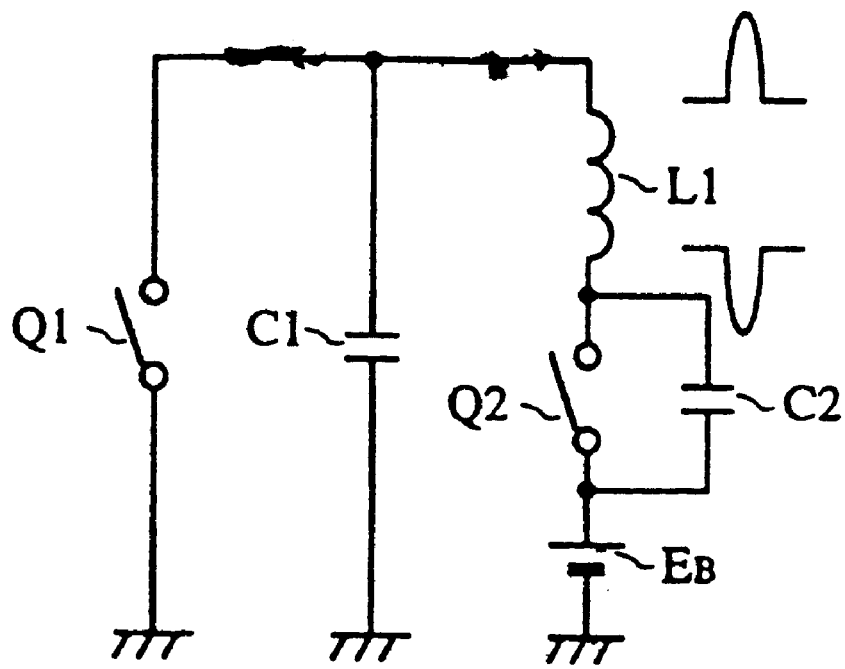
FIGS. 2A and 2B show explanatory circuit diagrams to explain the operation of the deflection current/high voltage integration type power supply shown in FIGS. 1A and 1B.
Figure 2B:
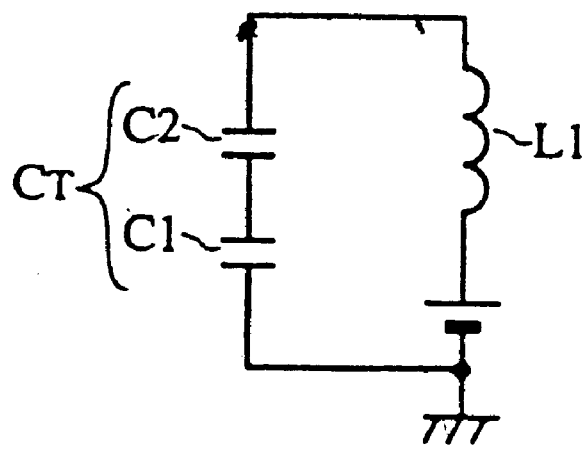
Figure 3A:
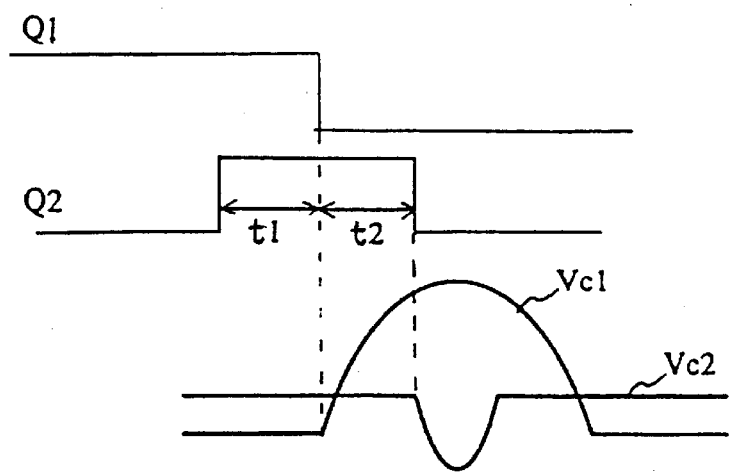
FIG. 3A shows waveforms of voltages across the capacitors C1 and C2, respectively and the timing relationship thereof with respect to the on/off operation of the switching elements Q1 and Q2.

FIGS. 2A and 2B show an essential elements for the operation of the deflection current/high voltage integration type power supply shown in FIGS. 1A and 1B. First, the switch elements Q1 and Q2 are turned on and energy is accumulated in the primary winding L1 of the flyback transformer. When the switch element Q1 is turned off, the energy accumulated in L1 is transferred to the capacitor C1 to generate a voltage in the capacitor C1. If the switch element Q2 is turned off during the energy transfer, an equivalent resonance circuit is formed as shown in FIG. 2B, and a voltage is generated in the combined serial capacitance CT by C1 and C2. FIG. 3A shows waveforms of voltages Vc1 and Vc2 across the capacitors C1 and C2, respectively.

Figure 3B:
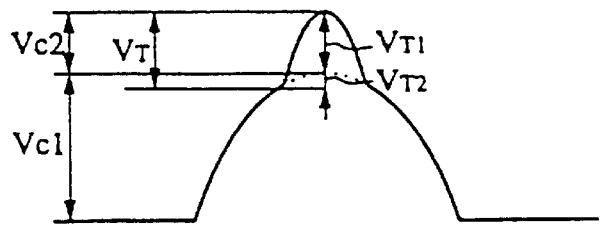
FIG. 3B shows a waveform of a voltage across the primary winding L1.

FIG. 3B shows a waveform of a voltage generated across the primary winding L1 of the flyback transformer T. VT denotes the voltage generated in combined capacitance CT in the process where the energy of L1 is shifted to combined capacitance CT. VT1 and VT2 are the values of VT which is divided by the reciprocal ratio of the capacitance C1 and C2.

As shown in FIG. 3B, in the case where the switch element Q2 is turned off after the switch element Q1 is turned off (during the flyback pulse period), the time (t1) until the switch element Q1 is turned off after the switch element Q2 is turned on is the accumulation time of the primary winding L1, and its energy is also the energy to charge the capacitor C1. After the switch element Q2 is turned off, the current flows into the primary winding L1 through capacitor C2 by the effect of the inductance of the primary winding L1. As a result, the inverse pulse voltage Vc2 of the magnitude corresponding to the off-timing of the switch element Q2 is generated in capacitor C2. If the on-timing of the switch element Q2 is common, the voltage Vc2 becomes the peak value corresponding to the off-timing of the switch element Q2 while the voltage Vc1 is approximately constant, and the high-voltage output to be supplied to the flyback transformer is approximately proportional to the sum of the voltage Vc1 and the voltage Vc2. On the other hand, the deflation current is approximately proportional to the voltage Vc1 and is changed little because the voltage Vc1 is constant.

Thus, in the case where the switch element Q2 is turned off after the switch element Q1 is turned off, both deflection current and the high voltage output can be simultaneously stabilized by detecting the deflection current to control the on-timing of the switch element Q2 and by detecting the high voltage output to control the off-timing of the switch element Q2.

Figure 3C:
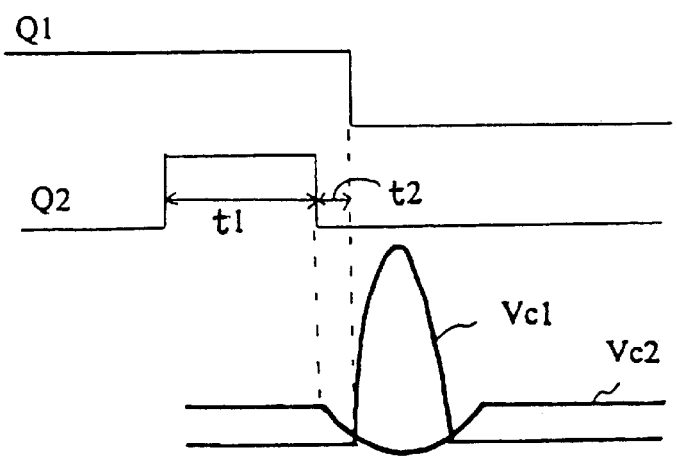
FIG. 3C shows waveforms of voltages across the capacitors C1 and C2, respectively in the case where the deflection current/high voltage integration type power supply is operated in a different timing, and the timing relationship thereof with respect to the on/off operation of the switching elements Q1 and Q2.

The deflection current/high voltage integration type power supply of the present invention can be controlled by a different timing. As shown in FIG. 3C, in the case where the switch element Q2 is turned off before the switch element Q1 is turned off (immediately before the flyback pulse period), the on-period (t1) of the switch element Q2 is the accumulation time for inductor L1, and its energy is proportional to the on-period of the switch element Q2. Thus, Vc1 is changed by the off-timing of the switch element Q2. After the switch element Q2 is turned off, the current flows into the primary winding L1 through the capacitor C2, and the inverse pulse voltage Vc2 of the magnitude corresponding to the off-timing of the switch element Q2 is generated. That is, both the voltages Vc1 and Vc2 are changed at the off-timing of the switch element Q2, but the changing direction of the magnitude is opposite to each other and the voltage Vc1+Vc2 becomes approximately constant in a case where the on-timing of the switch element Q2 is common and only the off-timing is changed. That is, if the on-timing of the switch element Q2 is constant, the high-voltage output becomes constant, and Vc1 is changed according to the off-timing of the switch element Q2, and the deflection current is changed.

Thus, when the switch element Q2 is turned off before the switch element Q1 is turned off, deflection current and the high voltage output can be simultaneously stabilized by detecting the high voltage output to control the on-timing of the switch element Q2, and by detecting the deflection current to control the off-timing of the switch element Q2.

In order to realize the aforementioned operation, the switch element Q2 is controlled by the control circuit 11 shown in FIG. 1A or 1B. Hereinafter, the generation of the control signal to control the switch element Q2 and the operation of the deflection current/high voltage integration type power supply will be explained in detail.

FIG. 4 shows waveforms of signals at various points of the circuit diagram illustrated in FIG. 1A. Waveform (a) denotes a drive signal input to the drive circuit 10, and waveform (b) denotes a horizontal drive (HD) signal in which the AFC (Automatic Frequency Control) pulse is clamped by the clamp circuit. Waveform (c) denotes an inverted signal of the waveform (b), and waveform (d) denotes the comparison triangular wave signal which is generated by integrating the inverted signal. Waveform (e) denotes the rectangular wave signal to be obtained through comparison of the voltage signal Va generated through detection of the deflection current with the triangular wave. Waveform (f) denotes the signal resulting from an AND operation on the signal (c) and the signal (e), and waveform (g) denotes the rectangular wave signal to be generated through comparison of the voltage signal Vb through detection of the high output voltage with the triangular wave. Waveform (h) denotes the result of an AND operation on the signal (b) and the signal (g). Waveform (i) denotes a signal resulting from an OR operation on the signal (f) and the signal (h). The signal (i) is the control signal for the switch element Q2, and is applied to the gate of the switch element Q2.

In FIG. 4, waveform (j) denotes the voltage Vcp of the capacitor C1 and waveform (k) denotes the voltage Vc2 across the capacitor C2.

Generally, the off-timing of the switching element Q2 is determined by comparing the high voltage control signal Vb with the triangular waveform (d) generated based on the horizontal drive signal (b). In the same manner, the on-timing of the switching element Q2 is determined by comparing the deflection current control signal Va with the triangular waveform (d) generated based on the horizontal drive signal (b).

In FIG. 4, while the switch element Q1 is turned off after Q2 is turned on, energy is accumulated in the primary winding L1 of the flyback transformer, and then, by turning off Q1, the energy accumulated in L1 is shifted to the capacitor C1 and the flyback pulse is generated. The HD signal indicated by the waveform in FIG. 4(b) is the clipped flyback pulse to be outputted from a tertiary winding (not indicated in the figure) of the flyback transformer. Then, by turning off the switch element Q2, the current from the primary winding L1 to capacitor C1 is disconnected and the voltage Vc2 is generated in the capacitor C2.

FIG. 5 shows waveforms relating to Vcp and Vc2. The voltage to be applied to the primary winding L1 of the flyback transformer is voltage Vcp+Vc2. (Because Vc2 is generated as the reverse voltage, and expressed in the downwardly going direction in the figure, while it is generated in the direction to increase the applied voltage for primary winding L1.) The peak voltage of Vc2 is changed by the off-timing of the switch element Q2. The above-mentioned voltage signal Vb is the signal of the high voltage output which is detected and passed through an inverting amplifier circuit. When the high voltage output increases, the voltage signal Vb decreases. Thus, when the high voltage output drops, voltage Vb increases to quicken the off-timing of Q2. On the other hand, if the high voltage output increases, voltage Vb drops to retard the off-timing of Q2. The high voltage output is thus stabilized.

Figure 6A:
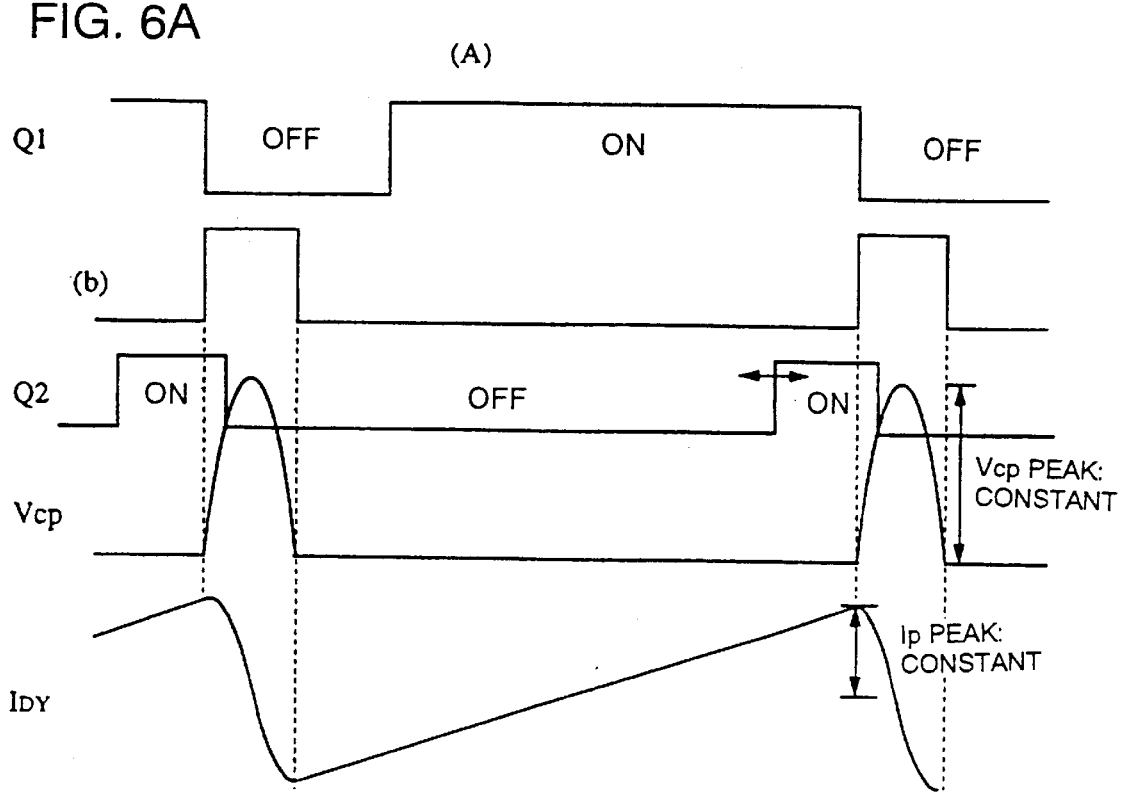
FIG. 6A shows waveforms measured at various points in the circuit diagram shown in FIGS. 1A and 1B.
Figure 6B:
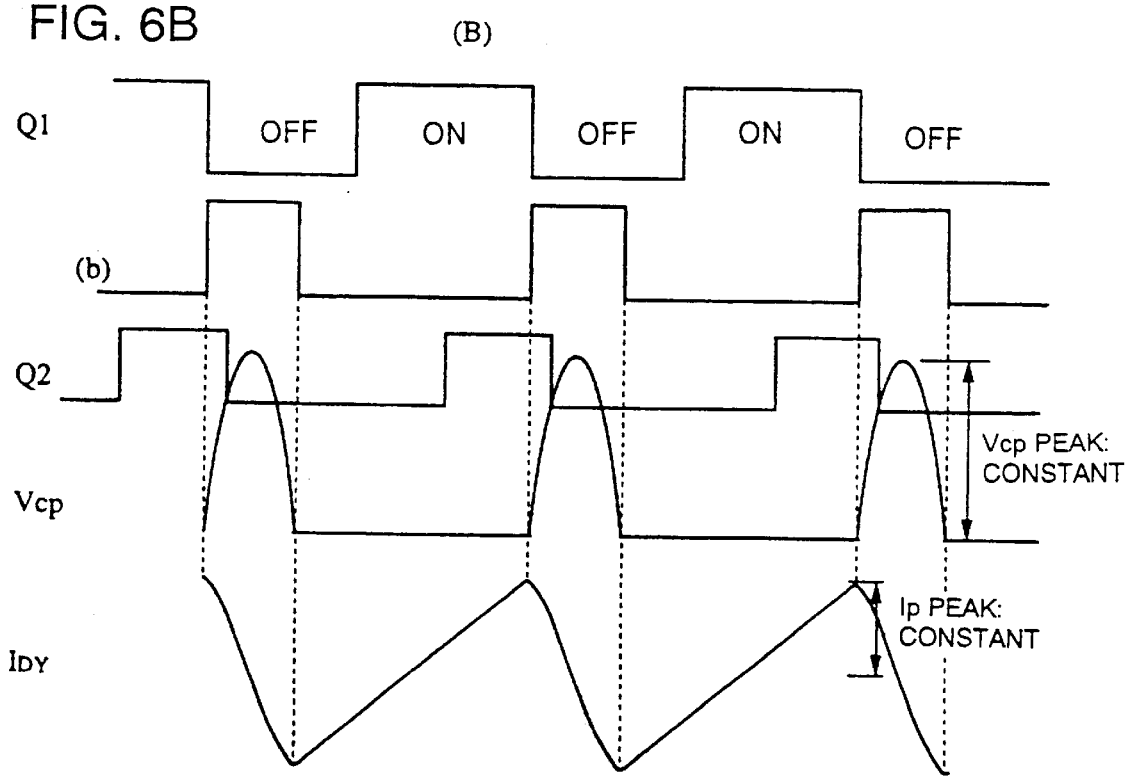
FIG. 6B shows waveforms operated at a horizontal scan frequency different from that of the waveforms of FIG. 6A.

FIGS. 6A and 6B show waveforms relating to the voltage Vcp and the deflection current $I_{DY}$. Because Vcp is proportional to the time until the switching element Q1 is turned off after the switching element Q2 is turned on, and the peak value of the deflection current $I_{DY}$ is approximately proportional to the peak voltage of Vcp, the deflection current can be controlled by the on-timing of the switching element Q2. Because the voltage signal Va drops when the deflection current $I_{DY}$ is reduced, the on-timing of the switch element Q2 is quickened to increase the deflection current if the deflection current is reduced. On the other hand, if the deflection current is increased, the on-timing of the switch element Q2 is retarded to reduce the deflection current. The deflection current is thus stabilized.

FIGS. 6A and 6B show the cases of a different horizontal scanning frequency. If the pulse width until the switch element Q1 is turned off after the switch element Q2 is turned on is constant, the peak value of the deflection current $I_{DY}$ becomes constant, and the deflection current can be controlled by the similar control irrespective of the horizontal scanning frequency. Thus, this system can be applied to a CRT ready for the wide horizontal scanning frequency range to be used for a display device of a computer, a so-called multi-scan CRT.

Because the MOS-FET is used as the switching element Q2 of the +B control circuit part, its drive circuit is simplified. Further, the parasitic capacitance of the MOS-FET can be used, and the capacitor C2 as a separate component is unnecessary and its capacitance can be reduced.

FIG. 5 indicates the case where the switch element Q2 is turned off when the HD signal is in the period of "H" level (the flyback pulse period), while FIG. 7 indicates the case where the switch element Q2 is turned off immediately before the flyback pulse period.

As illustrated in FIG. 7, if the off-timing of the switch element Q2 is changed, Vcp is also changed according thereto, and the deflection current $I_{DY}$ is changed thereby. On the other hand, the peak voltage of Vc2 is also changed by the off-timing of the switching element Q2. Though the voltage to be applied to the primary winding L1 of the flyback transformer is Vcp+Vc2, the changing direction of Vcp and Vc2 caused by the change in the off-timing of the switch element Q2 is opposite to each other, and Vcp+Vc2 is approximately constant when the on-timing of the switch element Q2 is common and only the on-timing is changed.

Thus, when the switch element Q2 is turned off before the switch element Q1 is turned off, the deflection current and the high voltage output can be simultaneously stabilized by detecting the high voltage output to control the on-timing of the switch element Q2 and by detecting the deflection current to control the off-timing of the switch element Q2.

Figure 8:
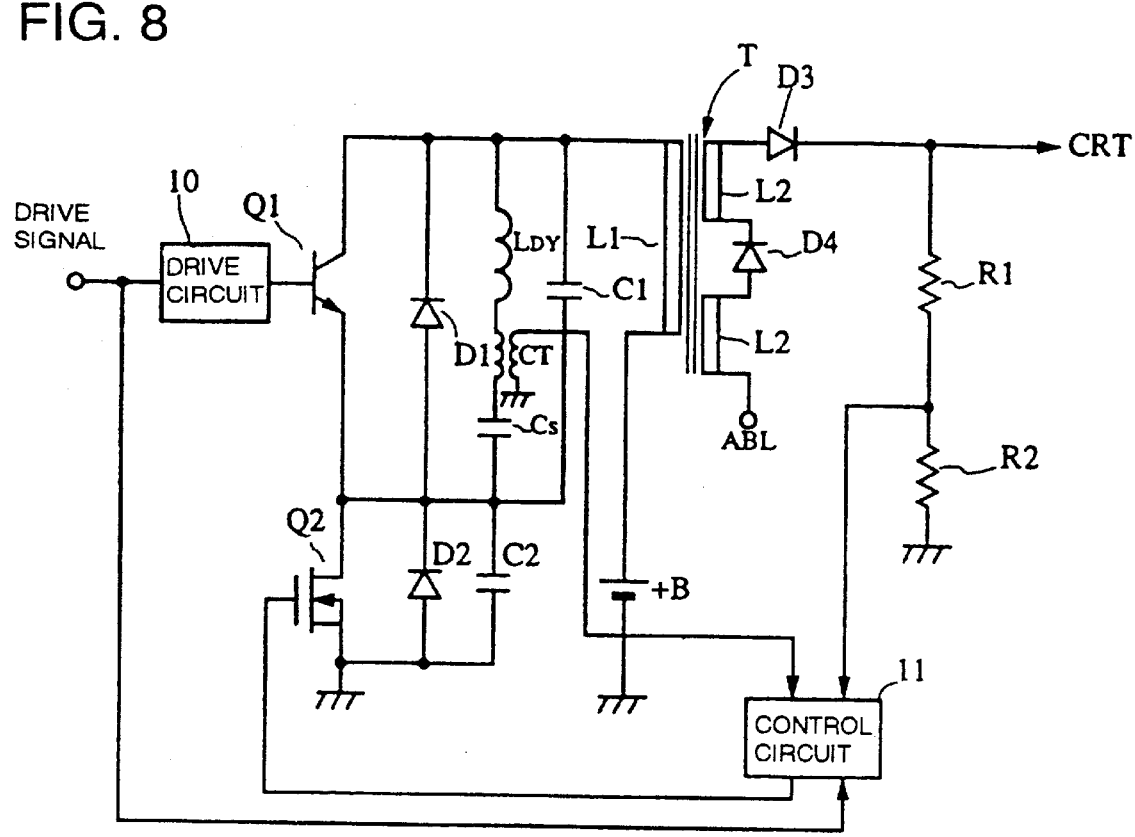
FIG. 8 is a circuit diagram of a deflection current/high voltage integration type power supply according to an example of a second embodiment of the present invention.

FIG. 8 is a circuit diagram of the deflection current/high voltage integration type power supply in a second embodiment. In this embodiment, the position of the resonance circuit including the switching element Q2 of the circuit illustrated in FIG. 3 is changed. A similar effect is obtained when the circuit part of the switching element Q2 and the capacitor C2 is provided on the grounding side.

Though the deflection current is detected using a current transformer in this embodiment, the peak value of the voltage Vcp of the switching element Q1 is approximately proportional to the peak value of the deflection current, and the deflection current may be indirectly detected by the peak value of Vcp. Further in this embodiment, a bipolar type transistor is used for the main switching element Q1 and a unipolar type transistor (FET) is used for the second switching element Q2, but the bipolar transistor or the unipolar transistor can be used for each of the switch elements Q1 and Q2.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A deflection current/high voltage integration type power supply, comprising:
   a flyback transformer having a primary winding and a secondary winding;
   a series circuit comprising a deflection coil and a first capacitor, connected in series with the primary winding of the flyback transformer;
   a resonance capacitor connected in parallel to the series circuit of the deflection coil and the first capacitor;
   a first switching element, connected in parallel with the series circuit of the deflection coil and the first capacitor, to be turned on and off by a drive signal so that a high voltage is generated in the secondary winding of the flyback transformer and a deflection current flows in the deflection coil;
   a parallel connection circuit comprising a second switching element and a second capacitor, connected in series with the primary winding of the flyback transformer, the second switching element having an on-timing when said second switching element is turned on and an off-timing when said second switching element is turned off; and
   a switching control means to control the deflection current flowing in the deflection coil and the high voltage generated in the secondary winding of the flyback transformer by controlling the on-timing and the off-timing of the second switching element in approximate synchronism with the drive signal.

2. The deflection current/high voltage integration type power supply of claim 1, wherein the switching control means detects the deflection current flowing in the deflection coil and controls the on-timing of the second switching element based on the detected deflection current so that the deflection current is stabilized, and detects the high voltage at the secondary winding of the flyback transformer and controls the off-timing of the second switching element so that the high voltage is stabilized.

3. The deflection current/high voltage integration type power supply of claim 2, wherein said second switching element comprises a MOS-FET.

4. The deflection current/high voltage integration type power supply of claim 1, wherein the switching control means detects the deflection current flowing in the deflection coil and controls the off-timing of the second switching element based on the detected deflection current so that the deflection current is stabilized, and detects the high voltage at the secondary winding of the flyback transformer and controls the on-timing of the second switching element so that the high voltage is stabilized.

5. The deflection current/high voltage integration type power supply of claim 4, wherein said second switching element comprises a MOS-FET.

6. The deflection current/high voltage integration type power supply of claim 1, wherein the first switching element has a first main terminal connected to a ground terminal and a second main terminal connected to a first side of the primary winding, the parallel connection circuit being coupled between a voltage source and a second side of the primary winding.

7. The deflection current/high voltage integration type power supply of claim 1, wherein the first switching element has a first and second main terminal, said first main terminal being connected through the parallel connection circuit to a ground terminal, the second main terminal being connected to a first side of the primary winding, a second side of the primary winding being coupled to a voltage source.

8. The deflection current/high voltage integration type power supply of claim 2, wherein the second switching element is turned off after the first switching element is turned off.

9. The deflection current/high voltage integration type power supply of claim 4, wherein the second switching element is turned off before the first switching element is turned off.

* * * * *